Nov. 21, 1933.  J. C. McCUNE  1,935,807
SAFETY CAR EQUIPMENT
Filed May 22, 1929   3 Sheets-Sheet 3
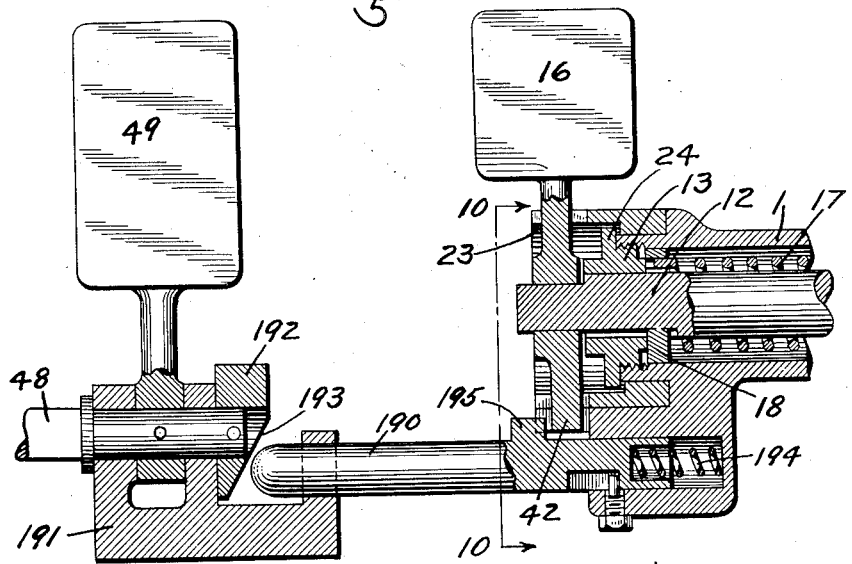
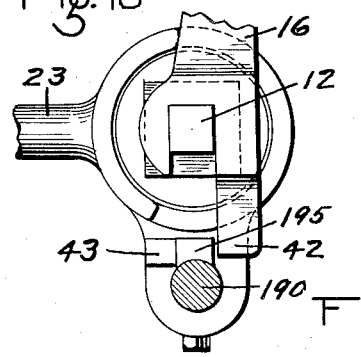
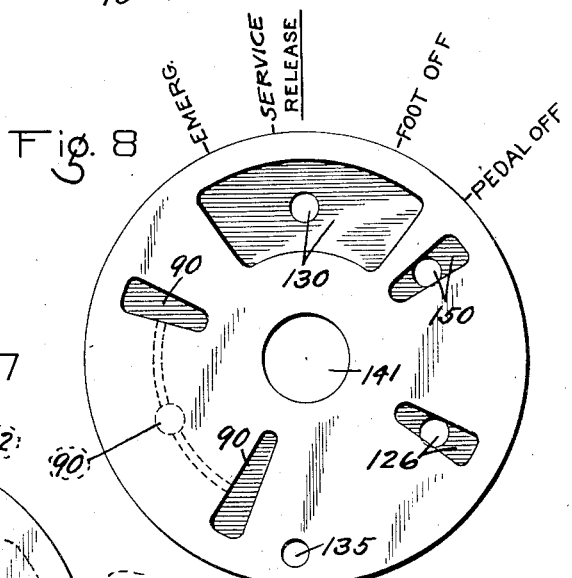
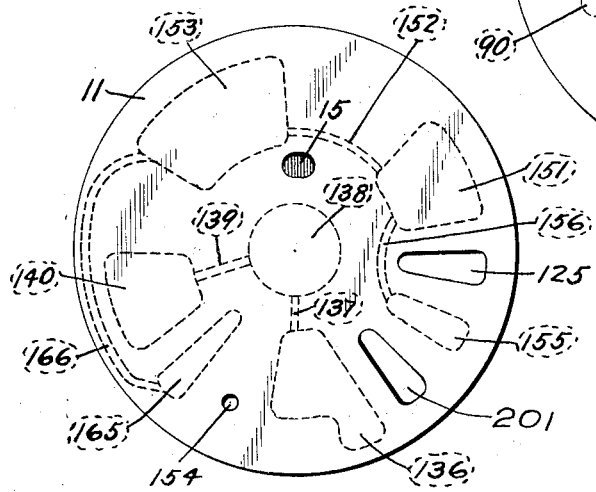
INVENTOR
JOSEPH C. McCUNE
BY *Wm. M. Cady*
ATTORNEY Patented Nov. 21, 1933

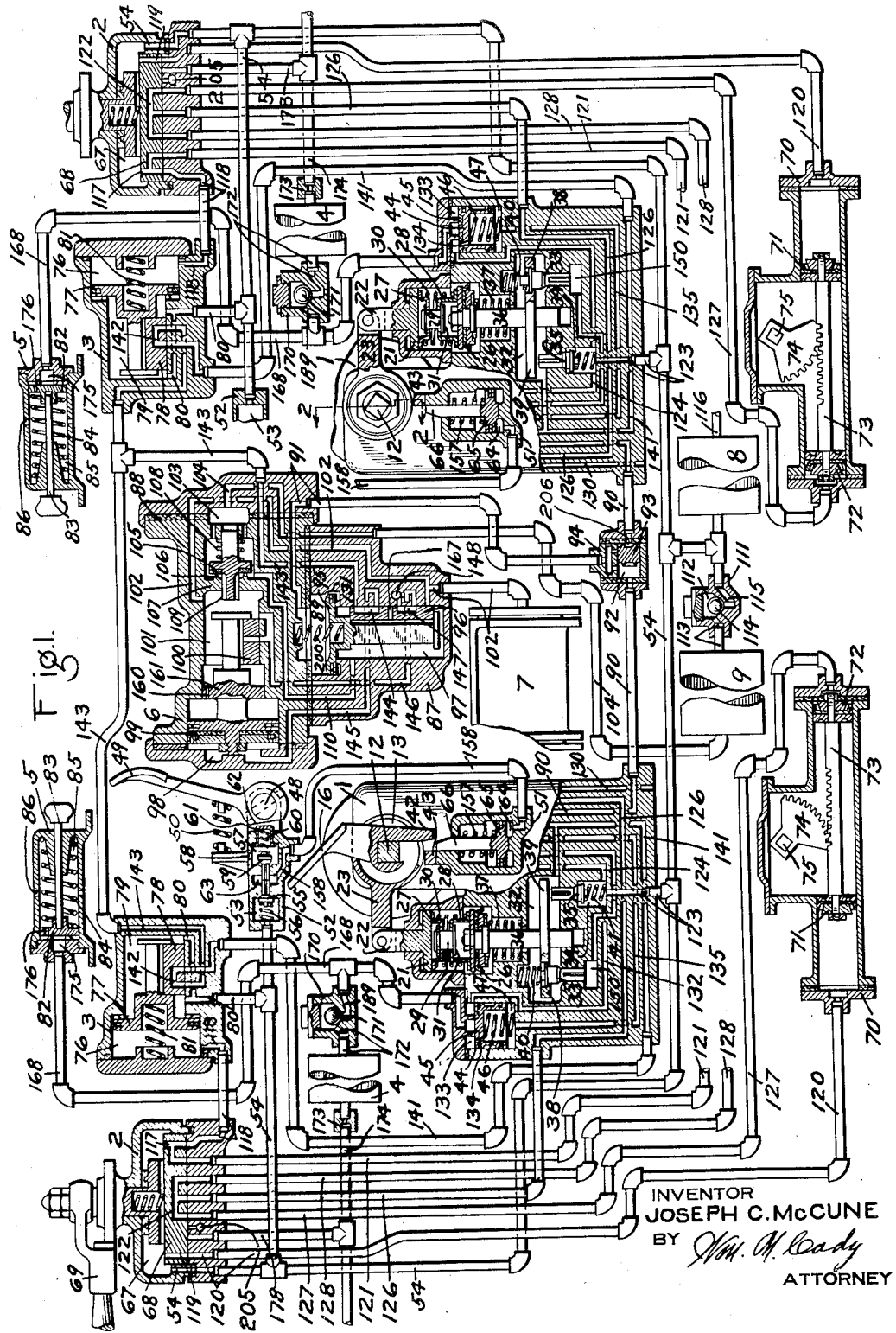

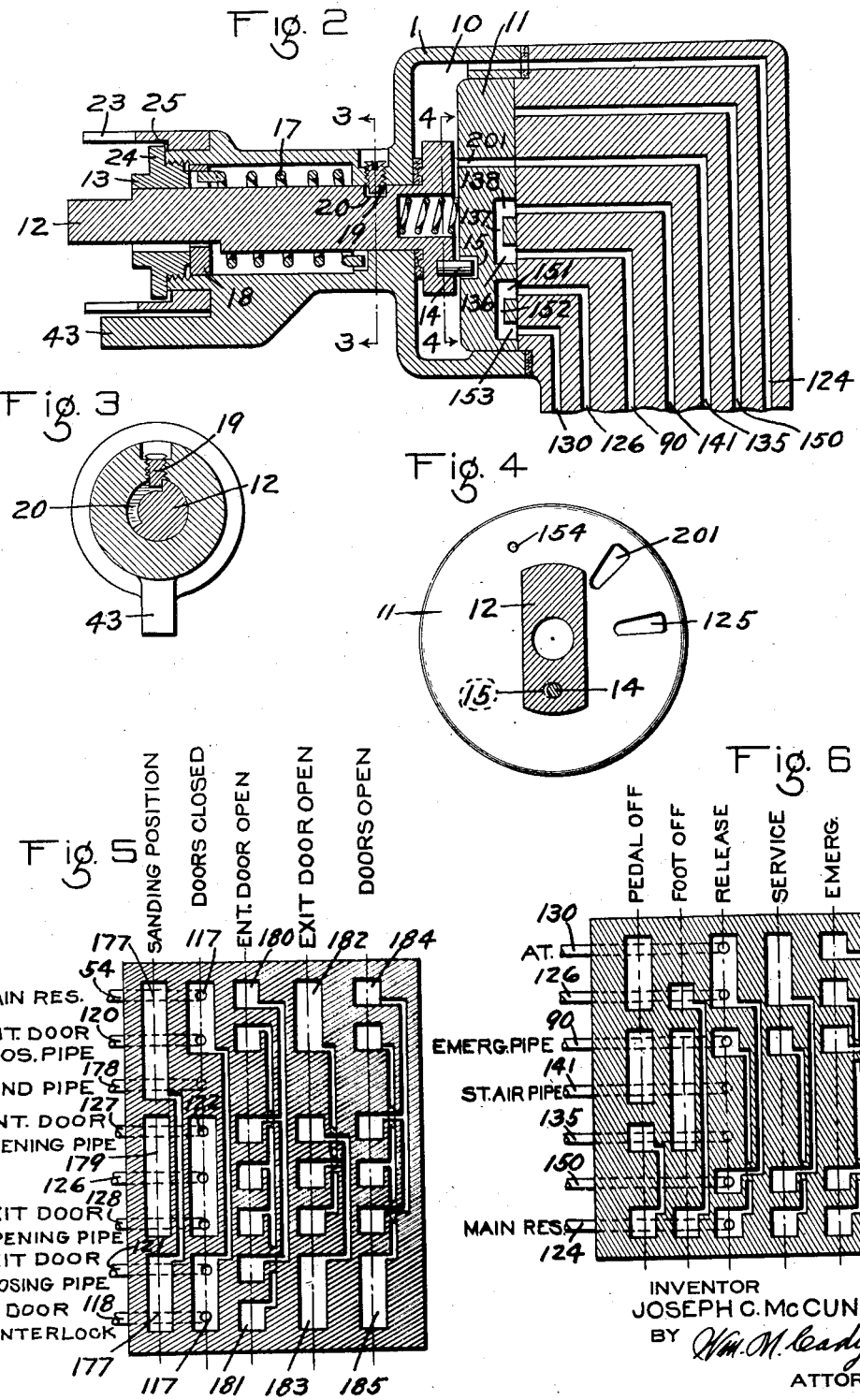

1,935,807

UNITED STATES PATENT OFFICE 1,935,807

SAFETY CAR EQUIPMENT

Joseph C. McCune, Edgewood, Pa., assignor to The Westinghouse Air Brake Company, Wilmerding, Pa., a corporation of Pennsylvania Application May 22, 1929. Serial No. 364,997

91 Claims. (Cl. 303—6.1)

This invention relates to fluid pressure brake and door controlling apparatus, and more particularly to a safety car control equipment in which the brakes are applied in the event of the incapacitation of the operator.

The principal object of my invention is to provide an improved safety car control equipment.

Another object of my invention is to provide an improved safety car control equipment in which the brake apparatus is normally controlled through the medium of a foot operated valve device, thus obviating the use of the hand operated valve device commonly employed in such equipment, and leaving the operator's hands free for controlling the operation of the car doors, making change, collecting fares and for any other purpose.

Another object of my invention is to provide a foot controlled fluid pressure brake equipment having means, operative in any power-on position or coasting position of the car motor controller, for enabling the operator to rest the foot he uses in controlling the brakes, and at the same time insuring that the brakes shall be automatically applied in case the operator becomes incapacitated.

Another object of my invention is to provide a safety car control equipment having novel means for controlling the operation of a car motor circuit breaker device and for controlling the sanding of the track rails when a dead man's emergency application is initiated.

A further object of my invention is to provide a safety car control equipment in which the sanding of the track rails is normally controlled by the door control valve device.

A still further object of the invention is to provide a safety car control equipment having novel means for effecting an application of the brakes in case the door controlling valve device is moved to any door open position while the car is running and for preventing the release of the brakes until the door controlling valve device is operated to door closed position.

Other objects and advantages will appear in the following more detailed description of my invention.

In the accompanying drawings; Figure 1 is a diagrammatic view, mainly in section, of an equipment embodying my invention; Figure 2 is an enlarged fragmental sectional view taken on the line 2—2 of Fig. 1; Figs. 3 and 4 are cross sectional views taken on the lines 3—3 and 4—4 respectively of Fig. 2; Fig. 5 is a development view of one of the door controlling valve devices; Fig. 6 is a development view of the rotary valve and seat of one of the brake valve devices; Fig. 7 is an enlarged view of the back of the rotary valve of one of the brake valve devices; Fig. 8 is an enlarged face view of the rotary valve seat of one of the brake valve devices, the positions of the food pedal being shown; Fig. 9 is a view, mainly in section, showing mechanically operative means for controlling the locking of the foot controlled brake pedal; and Fig. 10 is a sectional view of the same taken on the line 10—10 of Fig. 9.

As shown in the accompanying drawings, the safety car control equipment is of the double end type, and at each end of the car may comprise a foot controlled brake valve device 1, a door controlling valve device 2, a door interlock valve device 3, a sanding reservoir 4 and a circuit breaker device 5. The equipment also comprises an emergency valve device 6, a brake cylinder 7 and main reservoirs 8 and 9.

The foot controlled brake valve device 1 may comprise a casing having a chamber 10 containing a rotary valve 11 which is operatively connected to a rotatable operating stem 12, suitably journalled, adjacent its inner end, in the casing, and adjacent its outer end, in a member 13 having screw threaded connection with the casing. The connection of the rotary valve 11 and stem 12, provides for limited lost motion between the valve and stem, the purpose of such lost motion being hereinafter fully described. This connection is preferably made through the medium of a pin or projection 14, with which the stem 12 is provided, extending into a slot 15 formed in the back side of the rotary valve 11, which projection is adapted to engage the rotary valve at the ends of the slot to limit the relative movement between the stem and valve. The extreme outer end portion of the stem 12 is preferably made square in cross section, and upon this portion, a foot pedal 16, for controlling the rotation of the stem, is removably mounted.

Within the casing and surrounding the stem 12 is a torsion spring 17 having its inner end anchored to the casing and its outer end anchored to an annular plate 18 contained in the casing and secured to the stem 12.

For the purpose of limiting the rotary movement of the stem 12, a stop 19 is provided which has screw threaded connection with the casing and extends into a slot 20 extending part way around the stem and is adapted to engage with the stem at the ends of the slot.

Also contained in the brake valve casing is a plunger 21 having a stem 22 which extends upwardly through the casing and which, at its upper end, is pivotally connected to the outer end of an operating arm 23, through the medium of a pin or any other desired means. The inner end of this arm is rotatably mounted on the casing and is maintained in its proper position by a circular flange 24 on the member 13 overlapping an annular shoulder 25 on the arm. The arm 23 is adapted to be engaged by the forward edge of the foot pedal 16 to control the operation of the arm.

Arranged below the plunger 21 is a piston 26, and interposed between and engaging the under side of the plunger and the upper side of the piston 26, there is a spring assemblage comprising spaced plates 27 and 28 which are loosely connected together through the medium of a pin 29 which is anchored to the plate 27 and slidable relative to the plate 28. Interposed between the plates 27 and 28 and forcing them into engagement with the plunger 21 and piston 26 respectively, is a spring 30. The pin 29 is provided with a head 31 which is adapted to engage the plate 28. Since the pin 29 is anchored to the plate 27 and the head 31 engages the plate 28, the plates cannot be accidentally separated should it be found necessary to remove the spring assemblage in making repairs or for any other reason, thus preventing, in so far as possible, damage to the spring.

Contained in a chamber 32, in the brake valve casing, is a release pilot valve 33 and contained in a chamber 34 is an application pilot valve 35, the operation of both of said valves being controlled through the medium of a stem 36 secured to and depending downwardly from the piston 26. Interposed between and engaging the underside of the piston 26 and the casing, is a spring 37, the pressure of which is adapted to normally maintain the piston 26 in contact with the underside of the plate 28 of the spring assemblage as shown in Fig. 1.

The piston stem has laterally extending arms 38 and 39 which are contained in the chamber 32, and in the arm 38, the release valve 33 is slidably mounted, said valve being subject to the pressure of a spring 40 contained in the chamber 32. With the piston 26 in the position as shown in Fig. 1, the arm 38 maintains this valve 33 unseated against the pressure of the spring 40. The application pilot valve 35 has a fluted stem which extends upwardly into the chamber 32 where it is adapted to be engaged by the arm 39 of the piston stem 36. With the piston 26 in the position as shown in Fig. 1, the arm 39 will be out of engagement with the fluted stem of the valve and the valve will be maintained seated by the pressure of a spring 41 contained in the chamber 34.

The foot pedal 16, for controlling the operation of the brake valve device, is provided with a leg 42 which, when the pedal is mounted on the operating stem 12, extends below the stem and is adapted to engage a stop 43 to limit the movement of the pedal and stop it in "foot off" position, said stop 43 being preferably made integral with the casing.

The brake valve casing also contains a piston valve 44 adapted to be normally maintained seated against a seat ring 45 by the pressure of a spring 46 contained in a chamber 47 at one side of the piston valve. This piston valve is operative in effecting a dead-man's emergency application of the brakes to supply fluid under pressure to operate one of the circuit breaker devices 5 and to cause sand to be deposited upon the track rails, all of which will be hereinafter more fully described.

For rotating the shaft or spindle 48 of the usual car motor controller (not shown), a foot pedal 49 is provided, which is movable to coasting or any power on position against the pressure of a spring 50, the pressure of the spring being adapted to operate the pedal and shaft to power off position when pressure on the pedal is relieved.

For the purpose of maintaining the brake pedal 16 in release position when the operator removes his foot therefrom while the controller pedal 49 is in coasting or any power on position, or to permit the brake pedal to be moved to foot off position, should the pressure thereon be relieved when the controller pedal is in power off position, I provide a piston device 51, the operation of which is controlled by a valve device 52, the operation of said valve device in turn being controlled through the medium of the controller pedal 49. The valve device 52 may comprise a casing having a chamber 53 constantly connected to the main reservoir 8 through a pipe 54 and containing a valve 55 which is subject to the pressure of a coil spring 56. This valve device also has a chamber 57 which is connected to the atmosphere through a passage 58 and contains a valve 59, which is subject to the pressure of a spring 60. Projecting through the casing is a plunger 61 also subject to the pressure of the spring 60 which is adapted to be engaged by a cam surface 62 on the controller pedal 49. The valves 55 and 59 are provided with fluted stems, the ends of which engage, so that when one valve is seated, the other will be unseated. When the valve 55 is seated and the valve 59 unseated, a chamber 63 in the casing is connected to the atmosphere past the unseated valve 59 and through the valve chamber 57 and passage 58. When the valve 55 is unseated and the valve 59 seated, fluid under pressure is supplied from the valve chamber 53 to the chamber 63.

The piston device 51 may comprise a casing having a chamber 64 containing a piston 65 and connected to the chamber 63 in the valve device 52, through a pipe and passage 158. The piston 65 is provided with a stem 66 which extends through the casing and is adapted to be operated into and out of the path of travel of the leg 42 of the brake pedal 16.

Each door controlling valve device 2 may comprise a casing having a chamber 67 which is constantly connected to the main reservoir 8, through pipe and passage 54, and contains a rotary valve 68 which is adapted to be operated by a handle 69. This valve device is operative to control the operation of an entrance door engine 70 and an exit door engine, which has not been shown, but which is identical in construction and operation with the door engine 70.

Each door engine may comprise a casing containing pistons 71 and 72 which are connected together, in spaced relation to each other, by a rack bar 73, the teeth of which mesh with the teeth of a segment gear 74, secured to a rotatable door operating shaft 75.

Each door interlock valve device 3 may comprise a casing having a chamber 76 containing a piston 77 adapted to operate a slide valve 78 contained in a chamber 79 which is constantly connected to the main reservoir 8 through pipe 54 and a branch pipe and passage 80. Also contained in the piston chamber 76 and interposed between one side of the piston 77 and the casing is a spring 81.

Each circuit breaker device 5 may comprise a casing containing a piston 82 having a stem 83 projecting through the end of the casing and adapted to operate the usual line switch (not shown), for opening the car motor electric supply circuit when a dead-man's emergency application of the brakes is initiated. The piston 82 is subject to the pressure of a spring 84 contained in a chamber 85 at one side of the piston, said chamber being connected to the atmosphere through passages 86.

The emergency valve device 6 may comprise an emergency portion 87 and an application portion 88.

The emergency portion 87, of the valve device 6, may comprise a casing having a chamber 89 connected to an emergency pipe 90 through a passage and pipe 91, and a valve chamber 92 at one side of the check valve 93 of a double check valve device 94. Contained in the chamber 89 is an emergency piston 95 which is adapted to operate an emergency slide valve 96 contained in a chamber 97.

The application portion 88, of the valve device 6, may comprise a casing having a chamber 98 containing an application piston 99, which is adapted to operate a brake cylinder exhaust slide valve 100 contained in a chamber 101 connected to the brake cylinder 7 through a passage and pipe 102. The passage 102 also leads to the seat of the emergency slide valve 96. Contained in a chamber 103, which is connected to the main reservoir 9 through a passage and pipe 104, is a supply valve 105 which is normally maintained sealed against a seat ring 106, formed on a wall 107 of the casing, by the pressure of a spring 108. The valve 105 is provided with a fluted stem 109 which extends through the wall 107, and within the valve chamber 101, is adapted to be engaged by the end of the stem of the application piston 99.

The main reservoir 9 is constantly connected by pipe 104, to the supply valve chamber 103, in the application portion 88, and this chamber and the emergency valve chamber 97, in the emergency portion 87, are constantly connected through a passage 110.

Interposed between the main reservoirs 8 and 9, there is a check valve device 111, which may comprise a casing having a chamber 112 connected to the main reservoir 9 through a passage and pipe 113 and containing a ball check valve 114. The main reservoir 8 is connected to the underside of the check valve 114 through the pipe 54 and a passage 115.

Assuming a car embodying my improved safety car control equipment to be standing in a car barn with both of the brake valve devices 1 in pedal off position, and the fluid in the equipment at atmospheric pressure, and it is desired to initially charge the equipment, the operator applies the foot pedal 16 to the brake valve stem 12 at the head end of the car, and by the use of the pedal rotates the stem and rotary valve 11 to "foot off" position, i. e., to the position in which the leg 42 of the pedal engages the stop 43 to prevent the accidental return of the pedal to "pedal off" position.

The operator may now relieve the pressure on the foot pedal and cause the usual compressor (not shown) to operate to supply fluid under pressure to the main reservoir 8 through a pipe 116. From the main reservoir 8, fluid under pressure flows to the rotary valve chambers 67 of both of the door selector valve devices 2, by way of pipes and passages 54. From each of the chambers 67, fluid under pressure flows to the piston chamber 76 of one of the door interlock valve devices 3, through a port 117 in the rotary valve 68 and pipe and choked passage 118. From the pipe 54, fluid under pressure is also supplied to the valve chamber 79 of each of the door interlock valve devices, by way of a pipe and passage 80, and since the build up in pressure in this chamber and the piston chamber 76 will be substantially equal, the pressure of the spring 81 will maintain the piston 77 and slide valve 78 of the door interlock valve device in its extreme inner position as shown in Fig. 1.

Fluid under pressure also flows from the chamber 67 of each door controlling valve device to the door closing side of one of the entrance door engines by way of a port 119 in the rotary valve 68 and a passage and pipe 120 and to the door closing side of one of the exit door engines by way of the port 117 in the rotary valve and a passage and pipe 121.

With the rotary valve 11 of the brake valve device, at the head end of the car, in "foot off" position, fluid under pressure flows from the main reservoir pipe 54 to a cavity 122 in the rotary valve 68 of the door selector valve device by way of a pipe and passage 123, valve chamber 34 in the brake valve device, a passage 124, rotary valve chamber 10, a port 125 in the rotary valve 11, and a passage and pipe 126. From this cavity 122 fluid under pressure is supplied to the opening side of the entrance and exit door engines at the head end of the car through pipes 127 and 128 respectively. Since both sides of the entrance and exit door engines at the head end of the car are supplied with fluid under pressure from the main reservoir, the entrance and exit doors controlled by these engines will be balanced.

With the brake valve device at the rear end of the car in "pedal off" position, the entrance and exit door opening pipes 127 and 128 respectively are vented to the atmosphere by way of cavity 122 in the rotary valve 68 at the rear end of the car, pipe and passage 126, connected cavities 151 and 153 in the rotary valve 11 of the brake valve device and a passage 130. It will thus be seen that, since the door closing pipes, at the rear of the car, are supplied with fluid under pressure, and the door opening pipes are vented to the atmosphere, the entrance and exit doors at the rear end of the car are maintained closed.

From the main reservoir 8, fluid under pressure flows to the valve chamber 97 in the emergency portion of the emergency valve device, through pipe 54, a passage 115 in the check valve device 111, past the ball check valve 114, valve chamber 112, passage and pipe 113, main reservoir 9 and pipe and passage 104 to chamber 103 in the application portion of the emergency valve device, and from thence through passage 110. Fluid thus supplied to the valve chamber flows to the emergency piston chamber 89 through a feed groove 131 around the emergency piston 95.

Fluid under pressure is also supplied from the main reservoir 8 to the emergency piston chamber 89, through the main reservoir pipe 54, pipe and passage 123, valve chamber 34 in the brake valve device, a passage 132, a chamber 133 at one side of the piston valve 44, a passage 134 in the piston valve, chamber 47, a passage 135, a cavity 136 in the rotary valve 11, a passage 137 in the rotary valve, a cavity 138 in the rotary valve, a passage 139 in the rotary valve, a cavity 140 in the rotary valve, passage and pipe 90, valve chamber 92 in the double check valve device 94 and pipe and passage 91.

From the cavity 138 in the rotary valve 11, fluid under pressure is supplied to the piston chamber 98 in the application portion, of the emergency valve device 6, through a passage and pipe 141, a cavity 142 in the slide valve 78 of the door interlock valve device 3, choked passage and pipe 143, a cavity 144 in the emergency slide valve 96 and passage 145. The pressure of fluid building up in the piston chamber 98 causes the application piston 99 to move toward the right hand, carrying with it, the brake cylinder exhaust slide valve 100 to application position in which, communication from the exhaust slide valve chamber 101 to the atmosphere, by way of a passage 146, a cavity 147 in the emergency slide valve 96 and a passage 148, is closed off. As the application piston 99 is thus moved toward application position, the stem thereof engages the fluted stem 109 of the valve 105 and causes said valve to be unseated against the pressure of the spring 108, so that fluid under pressure, as supplied from the main reservoir 9, is supplied to the brake cylinder by way of valve chamber 101 and passage and pipe 102. The brakes will now remain applied until the operator operates the foot valve device 1 at the head end of the car to release or running position.

It will here be noted, that in initially charging the equipment, the pressures of the springs 46 will maintain the piston valves 44 seated, since the fluid pressures on both sides of the piston valves will be equal, the equalization being effected through the passage 134. In case of a dead man's emergency application of the brakes, as will hereinafter more fully appear, the valve 44 at the head end of the car will be unseated to supply fluid under pressure to cause the track rails to be sanded, and the circuit breaker to operate to cut off the electric supply from the usual trolley wire to the car motor. Since, in initially charging the equipment, the valve pistons 44 are maintained seated, the track rails will not be sanded nor will the circuit breaker device 5 be operated.

From the main reservoir pipe 54, fluid under pressure is also supplied to the valve chambers 53 in the valve devices 52.

With the equipment thus fully charged and the brakes applied, the operator, to release the brakes, operates the foot pedal 16, of the brake valve device, from "foot off" position to release position, in which position, fluid under pressure from the application piston chamber 98 is discharged to the atmosphere through passage 145, cavity 144 in the emergency slide valve 96, passages and pipe 143, cavity 142 in the door interlock valve device, passages and pipe 141, chamber 32 in the brake valve device, past the valve 33, which is maintained unseated by the pressure of the spring 37 acting on the piston 26, a passage 150, a cavity 151 in the rotary valve 11 of the brake valve device, a passage 152 in the rotary valve 11, a cavity 153 and passage 130.

With the application piston chamber 98 thus vented, the pressure of fluid in the exhaust slide valve chamber, causes the application piston 99 to operate to its extreme left hand or release position, carrying with it, the exhaust slide valve 100 and permitting the pressure of the spring 108 to seat the valve 105 to close off the communication from the main reservoir 9 to the brake cylinder 7.

With the exhaust slide valve 100 in release position, fluid under pressure from the brake cylinder 7 is discharged to the atmosphere through pipe and passage 102, exhaust slide valve chamber 101, past the exhaust slide valve 100, through passage 146, cavity 147 in the emergency slide valve 96 and passage 148.

Further, with the brake valve device 1 in release position, fluid under pressure will be supplied from the rotary valve chamber 10, in the brake valve device, to the emergency piston chamber 89 through a port 154 in the rotary valve 11, passage and pipe 90, valve chamber 92 in the double check valve device 94 and pipe and passage 91.

Still further, with the brake valve device in release position, the door opening sides of the entrance and exit door engines at the head end of the car are vented to the atmosphere through the door opening pipes 127 and 128 respectively, cavity 122 in the rotary valve 68 of the door controlling valve device, pipe and passage 126, a cavity 155 in the rotary valve 11, a passage 156 in the rotary valve, cavity 151 in the rotary valve, a passage 152 in the rotary valve, cavity 153 in the rotary valve and passage 130. Now, since the door closing sides of the entrance and exit door engines are supplied with fluid under pressure from the main reservoir, the doors will be maintained closed.

When the brakes are thus released, and it is desired to set the car in motion, the operator maintains the foot pedal 16 in release position with one foot and with his other foot operates the car controller pedal 49 forward against the pressure of the spring 50 to coasting position or any desired power on position. As the pedal 49 is thus moved, the cam surface 62 thereon engages the plunger 61, of the valve device 52, and causes said plunger to move inwardly compressing the spring 60, thus increasing the pressure of the spring on the valve 59. When the pedal 49 is in coasting or a power on position, the pressure of the spring 60 will have been sufficiently increased as to overcome the pressure of the spring 56, acting on the valve 55, so that the valve 59 will be seated and the valve 55 unseated. With the valve 55 unseated, fluid under pressure from the chamber 53, as supplied through the main reservoir pipe 54, flows to the piston chamber 64 in the piston device 51, through passage and pipe 158. The pressure of fluid thus supplied to the piston chamber 64, causes the piston 65 to move upwardly against the pressure of a spring 157, thus moving the stem 66 into the path of travel of the leg 42 of the foot pedal 16. Should the operator remove his foot from the foot pedal 16 when the motor controller is in coasting or any power on position, the leg 42 of the pedal will engage and stop against the stem 66 in " release " position. It will be seen that in coasting or any power on position of the motor controller the operator may rest the foot by which he operates the brake pedal.

When pressure on the controller foot pedal 49 is relieved, the pressure of the spring 50 causes the pedal to move to power off position, which relieves the pressure of the spring 60, so that the pressure of the spring 56, acting on the valve 55, causes said valve to seat and the valve 59 to unseat. The seating of the valve 55 closes off the further supply of fluid under pressure to the piston chamber 64, in the piston device 51, and the unseating of the valve 59 establishes communication through which fluid under pressure from the chamber 64 is discharged to the atmosphere. With the piston chamber 64 thus vented, the pressure of the spring 157 causes the piston 65 and stem 66 to move downwardly to their lowermost positions. In this position, the stem 66 is out of the path of travel of the leg 42 of the pedal 16 and if the pedal is not held in release position by the operator, it will operate to "foot off" position and a dead man's emergency application of the brakes would be effected, such an application being hereinafter fully described. It will thus be seen that if the operator desires to open the motor circuit without effecting a dead man's emergency application of the brakes, it is imperative that he hold the pedal 16 in release position before he permits the controller pedal 49 to be returned to foot off position.

To effect a service application of the brakes, the foot pedal is operated to "service" position, causing the rotary valve 11 of the brake valve device to move to service position, in which position, the connections established by the rotary valve when it was in release position, are maintained. When the pedal 16 is in release position, the front edge thereof is in engagement with the arm 23, and when the pedal is pressed forward to service position, it causes the arm 23 to rotate in an anti-clockwise direction, causing the plunger 21 to be depressed, which in turn, compresses the spring 30. When the pressure of the spring so compressed is great enough to overcome the pressure of the spring 37, the piston 26 and stem 36 are moved downwardly. As the stem 36 is thus moved, the pressure of the spring 40 causes the release pilot valve 33 to seat, after which the arm 39, of the stem, engages the fluted stem of the valve 35, causing said valve 35 to be unseated against the pressure of the spring 41. By the seating of the valve 33, the atmospheric communication from the chamber 32 in the brake valve device, by way of passage 150, and cavity 151, passage 152 and cavity 153 in the rotary valve 11 and passage 130, is closed off. Upon the unseating of the valve 35, fluid under pressure is supplied from the main reservoir pipe 54 to the piston chamber 98, in the application portion of the emergency valve device 6, through pipe and passage 123, valve chamber 34, past the unseated valve 35, through chamber 32, passage and pipe 141, cavity 142 in the slide valve 78 of the door interlock valve device 3, passages and pipes 143, cavity 144 in the emergency slide valve 96 and passage 145. The choked portion of the passage 143 in the emergency valve device limits the rate of build up of pressure in the piston chamber 98.

Pressure of fluid thus supplied to the application piston chamber 98 causes the application piston 99 and exhaust slide valve 100 to move, toward the right hand, to application position, in which, the slide valve closes the atmospheric communication from the brake cylinder 7. As the piston 99 is thus operated, the inner end of the piston stem engages the fluted stem 109 and causes the valve 105 to be unseated, establishing communication through which fluid under pressure is supplied from the main reservoir 9 to the brake cylinder 7, thus effecting a service application of the brakes.

Should it be desired to limit the brake cylinder pressure in effecting an application of the brakes, the foot pedal 16, instead of being operated to full service position, may be moved to any desired position between release position and full service position, thus adjusting the pressure of the spring 30 as desired, causing the piston 26 and stem 36 to move downwardly, seating the valve 33 and unseating the valve 35, as described in connection with a full service application. Upon the unseating of the valve 35, fluid under pressure is supplied to the application piston chamber, causing the application portion to operate to supply fluid under pressure to the brake cylinder 7 in the same manner as described in connection with a full service application. Now as the pressure of fluid in the chamber 32, in the brake valve device, becomes sufficient to overcome the pressure of the spring 30, the pressure of fluid acting on the piston 26 causes said piston to move upwardly. As the piston thus moves and carries the piston stem 36 with it, the arm 38 of the stem moves relatively to the valve 33 and the spring 40 maintains said valve seated, and the arm 39 of the stem permits the valve 35 to seat. Upon the seating of the valve 35, the further supply of fluid under pressure to the application piston chamber 98 is closed off. Now when the brake cylinder pressure, as supplied to one side of the application piston 99, from the application valve chamber 101, by way of a port 160, in a baffle piston 161, on the application piston stem, becomes substantially equal to the pressure of fluid in the piston chamber 98, the pressure of the spring 108 causes the valve 105 to seat, closing off the further supply of fluid under pressure to the brake cylinder 7. As the valve 105 is being moved toward its seated position, the application piston, stem and slide valve 100 are moved with it, and when the movement of the valve 105 comes to a stop by its seating on the seat ring 106, the movement of the application piston, stem and slide valve will come to a stop in lap position, in which the slide valve 100 closes off the communication from the brake cylinder to the atmosphere, thus maintaining the desired brake cylinder pressure.

If the brake cylinder pressure has been limited, as just described, and it is desired to increase it, the foot pedal 16 is moved further forward, causing the piston 26 and stem 36 to operate downwardly and again unseat the valve 35 and further compress the spring 30, causing the application portion of the emergency valve device to operate to supply fluid under pressure to the brake cylinder and to limit the brake cylinder pressure according to the pressure of the spring 30 as governed by the operation of the foot pedal 16, in the same manner as has hereinbefore been described.

When the brakes are applied, and it is desired to completely release them, the foot pedal 16 is permitted to return to release position, in which, the pressure on the plunger 21 and consequently the pressure on the spring 30, is entirely relieved, so that the pressure of fluid in the chamber 32, acting on the underside of the piston 26, causes said piston and stem 36 to move upwardly to their normal positions as shown in Fig. 1 of the drawings, and are maintained in this position by the spring 37. When the stem 36 is thus moved upwardly, the arm 38 thereof engages and lifts the valve 33 from its seat, thus venting the application piston chamber 98 to the atmosphere in the same manner as has been described in connection with the release of the brakes after initially charging the equipment, causing the application portion of the emergency valve device to operate to vent the brake cylinder 7 to the atmosphere as before described.

If it should be desired to gradually release the brake, the operator permits the foot pedal 16 to move toward "release" position, thus reducing the pressure of the spring 30. With the pressure of this spring thus reduced, the pressure of fluid in the chamber 32 causes the piston 26 and stem 36 to move upwardly against the reduced pressure of the spring 30, unseating the valve 33 and permitting fluid under pressure to be vented thereapast from the application piston chamber 98 to the atmosphere through the brake valve device 1. Now when the pressure of fluid in the chamber 32 is reduced slightly below the pressure of the spring 30, the pressure of the spring will move the piston 26 and stem 36 downwardly until the piston is balanced at which time the valve 33 will have been seated. When the pressure of fluid in the application piston chamber 98 is thus reduced, fluid at brake cylinder pressure, acting on the back side of the application piston, causes said piston and exhaust slide valve 100 to move to release position, in which, fluid under pressure is vented from the brake cylinder to the atmosphere through pipe and passage 102, exhaust slide valve chamber 101, passage 146, cavity 147 in the emergency slide valve 96 and passage 148. Now when the brake cylinder pressure reduces slightly below the pressure of fluid in the application piston chamber 98, the piston 99 will operate the slide valve 100 to lap position, closing off the further release of fluid from the brake cylinder to the atmosphere. When the slide valve is in lap position, the end of the piston stem stops against the end of the fluted stem 109 of the supply valve 105.

In moving the foot pedal 16 to "service" position, the pin 14 mounted in and rotatable with the brake valve stem 12, engages the rotary valve 11 at the forward end of the slot 15, causing the rotary valve to rotate. The slot 15 is of such a length that when pressure on the pedal is relieved, the pin 14 will not engage the rotary valve until the pedal is returned to "release" position, thus it will be seen that, once the pedal has been moved to "service" position, it may be returned to "release" position before the rotary valve will again be operatively engaged by the pin. By the provision of this lost motion between the stem 12 and rotary valve 11, the brakes may be graduated on and off without operating the rotary valve. By relieving the foot pedal of the weight of the rotary valve 11, the operator may manipulate the brake more easily and accurately than he could if he had to move the rotary valve.

To effect an emergency application of the brakes, the operator presses the foot pedal 16 to "emergency" position, operating the arm 23, plunger 27, piston 26 and piston stem 36 to permit the spring 40 to seat the valve 33 and to cause the valve 35 to unseat. Movement of the foot pedal causes the rotary valve 11 to operate to emergency position, and with the valve 11 in this position, fluid under pressure from the emergency piston chamber 89, in the emergency valve device 6, is discharged to the atmosphere, through passage and pipe 91, valve chamber 92 in the double check valve device 94, pipe and passage 90, a cavity 165 in the rotary valve 11, a passage 166 in the rotary valve, cavity 153 in the rotary valve and passage 130. With the chamber 89 thus vented, the pressure of fluid present in the emergency valve chamber 97, as supplied from the main reservoir 9 by way of pipe and passage 104, chamber 103 and passage 110, causes the emergency piston 95 to move to emergency position, against the pressure of a spring 200, carrying with it the emergency slide valve 96. With the emergency slide valve in emergency position, the passage 102, leading from the slide valve seat, is uncovered, so that fluid under pressure from the emergency valve chamber 97 flows to the brake cylinder 7, past the end of the emergency slide valve and through passage and pipe 102.

Fluid under pressure thus supplied to the brake cylinder 7 is prevented from discharging to the atmosphere, since the emergency slide valve closes off the communication from the brake cylinder exhaust passage 144 to the passage 148 leading to the atmosphere.

Further with the emergency slide valve 96 in emergency position, the communication from the choked straight air passage 143 to the application piston chamber 98, by way of the cavity 144 in the emergency slide valve and passage 145, is closed off and another communication established in which there is no restriction to the flow of fluid to the application piston chamber 98. This communication is established by the registration of a port 167 in the emergency slide valve with the passage 145, so that fluid under pressure flows from the emergency valve chamber 97 to the application piston chamber 98, through this port and passage, causing the several parts of the application portion to operate to application position, thus further supplying fluid under pressure to the brake cylinder by way of the passage and pipe 102 in the same manner as fluid under pressure is supplied to the brake cylinder in effecting a service application of the brakes.

It will be noted that, in the operation of the emergency valve device, in effecting an emergency application of the brakes, the application portion or the emergency portion or both portions may operate to effect the control of the application and release of the brakes, all of which has been fully described in my pending application for United States Letters Patent, for Straight air emergency valve device, filed April 1, 1929, and Serial Number 351,495.

If, when the foot pedal is operated to emergency position, the emergency portion, of the emergency valve device, should fail to operate to emergency position, fluid under pressure supplied to the straight air pipes and passages past the unseated valve 35 will flow to the application piston chamber 98 by way of the cavity 144 in the emergency slide valve 96 and passage 145, which would result in an application of the brakes, equivalent to a service application. With the rotary valve 11 of the brake valve device in emergency position, fluid under pressure from the valve chamber 10 is supplied to the door opening sides of the entrance and exit door engines by way of port 201 in the rotary valve, passage 126, cavity 122 in the rotary valve 68 of the door controlling valve device, and passages and pipes 127 and 128 respectively, and since the door closing sides of the engine are supplied with fluid under pressure, the doors will be balanced and may be operated manually. Should the operator be incapacitated, and permit the brake valve device to operate to "foot off" position, an automatic emergency application of the brakes will be effected. When the rotary valve 11 is operated to this position, the emergency passage 90 is connected to the straight air passage 141, through the cavity 136 in the rotary valve 11, and passage 137 and cavity 138 in the rotary valve, thus effecting a sudden reduction in the pressure of fluid in the emergency piston chamber 89. Upon such a reduction the emergency valve device will operate to supply fluid under pressure to the brake cylinder in the same manner as described in connection with the effecting of an intentional emergency application.

With the rotary valve 11 in foot off position, fluid under pressure present in the chamber 47 at the underside of the piston valve 44 is discharged to the straight air passage and pipe by way of passage 135, cavities 136 and 138 and passage 137 in the rotary valve 11.

With the chamber 47 thus vented, the pressure of fluid, present in chamber 133 and constantly supplied from the main reservoir 8 through the main reservoir pipe 54, pipe and passage 123, valve chamber 41 in the brake valve device and passage 132, causes the valve piston 44 to move downwardly against the pressure of the spring 46 and away from the seat ring 45. With the piston valve thus unseated, fluid under pressure from the chamber 133 flows to and charges the sanding reservoir 4 through a pipe 168, a passage 189 in the casing of a check valve device 170 past a ball check valve 171 and through a passage and pipe 172, and from this reservoir, fluid under pressure flows to the usual sand traps (not shown) through a choke fitting 173 and a pipe 174.

Fluid under pressure supplied to the pipe 168 also flows to a piston chamber 175 in the casing of the circuit breaker device 5 at the head end of the car. Pressure of fluid thus supplied to the piston chamber 175 causes the circuit breaker piston 82 and stem 83 to move outwardly against the pressure of the spring 84, the outer end of the stem being adapted to operate a line switch device to open the electric circuit to the car motors.

Fluid under pressure flows from the chamber 133 at one side of the piston valve 44 to the other side thereof, through the passage 134 in the piston valve, and when the pressures on both sides of the piston valve are substantially equal, the pressure of the spring 46 causes the piston valve to move upwardly and again seat on its seat ring 45, thus closing off the further supply of fluid under pressure from the main reservoir to the sanding reservoir 4 and piston chamber 175 in the circuit breaker device.

When the piston valve 44 is again seated, fluid under pressure contained in the pipe 168 and circuit breaker piston chamber 175, is discharged to the atmosphere through a passage 176 in the circuit breaker piston 82, spring chamber 85 and passage 86. When the pipe 168 and chamber 175 are thus vented, the pressure of the spring 84 causes the piston 82 to be operated to its normal position as shown in Fig. 1 of the drawings.

The check valve device 170 prevents the back flow of fluid from the sanding reservoir when the pipe 168 is vented to the atmosphere, so that fluid under pressure from this reservoir blows down through the sand traps.

Further, with the rotary valve 11 of the brake valve device in "foot off" position, fluid under pressure from the rotary valve chamber 10, as supplied from the main reservoir 8, through the passage 124, flows to the cavity 122 in the rotary valve 68 of the door controlling valve device 2, at the head end of the car, through the port 125 in the rotary valve 11 and passage and pipe 126, and from this cavity, flows to the door opening sides of the entrance and exit door engines through the door opening pipes 127 and 128 respectively, thus balancing the entrance and exit doors, so that they may be controlled manually.

If, at any time, it is desired to sand the track rails, the operator operates the door control valve device to "sanding" position, in which, fluid under pressure from the valve chamber 67, in the rotary valve device, as supplied from the main reservoir 8, through pipe and passage 54, flows to the sand pipe 174 through a port 177 in the rotary valve 68 and passage and pipe 178. With the rotary valve 68 in "sanding" position, fluid at main reservoir pressure is also supplied from the port 177 to the entrance door closing pipe 120, exit door closing pipe 121 and door interlock pipe 118, the entrance door opening pipe 127 and exit door opening pipe 128 are both connected to the atmosphere when the brake valve device is in either release or service position, through a cavity 179 in the rotary valve 68, pipe and passage 126 connected cavities 155, 151 and 153 in the rotary valve 11 of the brake valve device and passage 130, thus the exit and entrance doors will be maintained closed when the door control valve device is in sanding position.

With the door controlling valve device in sanding position, fluid under pressure flows from the port 177 in the rotary valve 68 to the atmosphere through a passage 205. This passage is very small in diameter and as fluid under pressure flows therefrom, an audible sound will be produced which continues as long as the valve device remains in sanding position and thus serving to warn the operator that the valve device is in sanding position.

With the door controlling valve device in "doors closed" position, the connection to the sanding pipe 178 is closed and the doors are maintained closed as hereinbefore described.

If, when the car is brought to a stop, the operator desires to open the entrance door only, he operates the door controlling valve device 2 to "entrance door open" position, in which, fluid under pressure from the rotary valve chamber 67, as supplied from the main reservoir 8, is supplied to the door opening side of the entrance door engine 70, through a port 180 in the rotary valve 68 and the entrance door opening pipe 127, and further, from the port 180, fluid under pressure is also supplied to the door closing side of the exit door engine. At the same time, fluid under pressure is released from the piston chamber 76, in the door interlock valve device 3, to the atmosphere, by way of pipe and choked passage 118, a cavity 181 in the rotary valve 68, a passage and pipe 126, connected cavities 155, 151 and 153 in the rotary valve 11 of the brake valve device and passage 130. The door closing side of the entrance door engine 70, and the door opening side of the exit door engine, are vented to the atmosphere through pipes 120 and 128 respectively, cavity 181, passage and pipe 126 and through the brake valve device and passage 130.

With the piston chamber 76, in the door interlock valve device, thus vented, fluid at main reservoir pressure, present in the slide valve chamber 79, causes the piston 77 to operate to its extreme left hand position, against the pressure of the spring 81, carrying with it the slide valve 78, thus closing off communication from the application piston chamber 98 to the brake valve device 1 and establishing communication through which the pressure of fluid in the application piston chamber 98 is maintained by the pressure of fluid supplied from the main reservoir 8, by way of pipe 54, pipe and passage 80, cavity 142 in the slide valve 78 of the door interlock valve device, passage and pipe 143, cavity 144 in the emergency slide valve 96 and passage 145. Since the pressure of fluid in the piston chamber 98 is thus maintained, the exhaust slide valve maintains the communication from the brake cylinder to the atmosphere closed and the application portion is adapted to function to maintain the brake cylinder pressure.

It will here be noted that the passage 118 in the door interlock valve device is choked to such an extent that the venting of fluid under pressure from the piston chamber 76 is gradual, so that the operation of the piston 77 and slide valve 142, to their extreme left hand positions, is retarded, thus delaying the connecting of the main reservoir 8 to the piston chamber 98 in the application portion of the emergency valve device and consequently delaying the supplying of fluid under pressure from the main reservoir 9 to the brake cylinder. The reason for this delay is to prevent the application of the brakes with full main reservoir pressure immediately upon the operation of the door controlling valve device to any door open position. Should the operator, in bringing the car to a gradual stop, operate the door controlling valve device to any door open position before the car comes to a stop, the supplying of fluid under pressure from the main reservoir 9 to the brake cylinder is delayed for a short period of time during which the car may be brought to a stop, thus reducing the possibilities of a rough stop which would be effected if the brake cylinder were supplied with fluid under pressure immediately upon the operation of the door controlling valve device to any door open position.

Since the door closing side of the entrance door engine is vented to the atmosphere, and the door opening side is supplied with fluid under pressure, the door engine will operate to open the entrance door, and since the door opening side of the exit door engine is vented and the door closing side is supplied with fluid under pressure, the exit door will be maintained closed.

If the operator desires to open the exit door and to maintain the entrance door closed, he operates the door controlling valve device to "exit door open" position, in which, a port 182 in the rotary valve 68 establishes communication through which fluid under pressure is supplied from the rotary valve chamber 67 to the entrance door closing pipe 120 and to the exit door opening pipe 128. At the same time, a cavity 183 in the rotary valve 68 establishes communication through which the piston chamber 76 in the door interlock valve device, exit door closing pipe 121 and entrance door opening pipe 127 are vented to the atmosphere by way of pipe and passage 126 and the brake valve device 1.

With the piston chamber 76 of the door interlock valve device thus vented, said device operates, as before described, to cause the application piston chamber pressure to be maintained.

If the operator should desire to open both the entrance and exit doors, he operates the door controlling valve device to "doors open" position, in which, fluid under pressure is supplied to the entrance door opening pipe 127 and exit door opening pipe 128, through a port 184 in the rotary valve 68 and, at the same time, the piston chamber 76 in the door interlock valve device and the entrance and exit door closing pipes 120 and 121 respectively, are vented to the atmosphere by way of a cavity 185 in the rotary valve 68, pipe and passage 126 and the brake valve device 1. With the piston chamber 76 in the door interlock valve device thus vented, said device operates as before described to cause the application piston chamber pressure to be maintained.

It will here be noted that, with the door controlling valve device in any door open position, the door interlock valve device will be in its extreme left hand position, thus supplying fluid under pressure from the main reservoir to the application piston chamber 98, thus maintaining the application portion in position to prevent the discharge of fluid under pressure from the brake cylinder. In this position of the door interlock valve device, the slide valve thereof closes off communication between the application piston chamber 98 and the brake valve device, thus rendering it impossible to release the brakes by the use of the brake valve device until such time as the door or doors are closed.

If, when the car is in motion, the operator should move the door controlling valve device to any door open position, the door interlock valve device 3 will operate from its normal position, as shown in Fig. 1, to its extreme left hand position, in which, fluid under pressure, from the main reservoir 8, is supplied to the application piston chamber 98, causing the application portion to function to supply fluid under pressure to the brake cylinder, in the same manner as has been described in connection with the effecting of a service application of the brakes. It will thus be seen that if the door controlling valve device is not immediately returned to "doors closed" position, the car will be brought to a stop, regardless of the wishes of the operator.

As hereinbefore described there is a check valve device 111 interposed between the main reservoirs 8 and 9 which normally operates to permit the flow of fluid from the reservoir 8 to the reservoir 9 and prevents the back flow of fluid from the reservoir 9, so that, although the main reservoir 8 and main reservoir pipe 54 may be depleted of fluid under pressure the reservoir 9 will remain charged. It will thus be seen that, in case of the rupture of any pipe, other than the pipe 104, fluid under pressure will be supplied from the reservoir 9 to the brake cylinder when an emergency application is effected due to such rupture.

With the brakes applied and the foot valve device at the head end of the car in "foot off" position, and the operator desires to change ends, he slides the foot pedal 16 outwardly along the valve stem 12 until the pedal is out of engagement with the arm 23 and stop lug 43, at which time, the force of the torsion spring 17 causes the stem 12 and consequently the rotary valve 11 to rotate to "pedal off" positions, after which the pedal may be easily lifted out of engagement with the stem 12. When the rotary valve 11 is thus moved to pedal off position, the emergency pipe and passage 90 and check valve chamber 92 at the left hand side of the double check valve device 94 is connected to the straight air passage 140 and pipe 141. Now since the foot valve device at the rear end of the car is also in "pedal off" position fluid under pressure is also present in the chamber 206 and emergency pipe and passage 90 at the right hand side of the double check valve device. It will therefore be seen that with both of the check valve chambers, 92 and 206 connected together through the foot valve devices and straight air pipe 141, the pressures of fluid in said chambers will be substantially equal so that the check valve 93 will remain in its extreme right hand position as shown in Fig. 1 of the drawings.

With the rotary valve 11 in pedal off position fluid under pressure is supplied to the piston valve chamber 47 from the main reservoir pipe 54 through pipe and passage 123, valve chamber 34, passage 124, rotary valve chamber 10, the port 201 in the rotary valve 11 and passage 135, thus maintaining the piston valve in its seated position against the pressure of fluid supplied from the main reservoir pipe 54 to the chamber 133 through passage 132.

Further when the rotary valve 11 is in this position, the pipe and passage 126 is vented to the atmosphere through cavity 151, passage 152 and cavity 153 in the rotary valve 11 and passage 130, thus venting the door opening sides of the entrance and exit door engines so that fluid at main reservoir pressure, as supplied through the door controlling valve device to the door closing sides of the entrance and exit door engines, will maintain the doors closed.

Since the foot valve device at the rear of the car is also in "pedal off" position the rear doors will be maintained closed and the piston valve 44 maintained seated in the same manner as has been described in connection with the equipment at the head end of the car.

The operator now places the foot pedal 16 on the stem 12 of the foot valve device at the rear end of the car, making this end of the car the operating end, and by the use of the pedal, rotates the stem and rotary valve 11 to "foot off" position so that the same connections are effected as those described in connection with the operation of the foot valve device, at the head end of the car, in initially charging the equipment.

Now if it is desired to release the brakes the operator presses the foot pedal forward from "foot off" position to release position causing the rotary valve 11 to be rotated to a corresponding position.

With the rotary valve 11 at the operating end of the car thus moved to release position, the communication of the straight air passage 141 with the emergency passage 90 is closed off and a communication is established through which fluid under pressure is supplied from the main reservoir pipe 54 to the emergency passage and pipe 90 and consequently the valve chamber 206 in the double check valve device 94, through pipe and passage 123, at the operating end of the car, valve chamber 34, passage 124, rotary valve chamber 10 and ports 154 in the rotary valve 11.

Further, with the rotary valve 11, at the operating end of the car in release position, the straight air passage 141 is connected to the passage 130, leading to the atmosphere, through valve chamber 32, past the unseated valve 33, through passage 150, cavity 151 in the rotary valve 11, passage 152 in the rotary valve and cavity 153 in the rotary valve. With this communication established the brakes will be released in the same manner as described before.

Since the valve chamber 92 in the double check valve is connected to the straight air passage 141 at the non-operating end of the car, through the medium of the foot valve device at this end of the car, there will be a slight reduction in the pressure of fluid in this check valve chamber just as soon as the straight air passage 141 at the operating end of the car is connected to atmosphere and upon such a reduction, the pressure of fluid in the check valve chamber, as supplied from the main reservoir pipe 54, causes the double check valve 93 to operate to its extreme left hand position, in which, fluid will be supplied to the emergency piston chamber 89 through the emergency pipe 90 at the right hand side of the double check valve, valve chamber 206 and pipe 91. The reduction in the pressure of fluid in the check valve chamber 92 will be so slight before the check valve operates to close off the communication to the pipe 90 at the left hand side of the check valve device that the emergency piston 95 will not operate.

With the check valve 93 in its extreme left hand position, the equipment may now be operated to control the application and release of the brakes as described.

In Fig. 1 of the drawings there is shown, fluid pressure operated means for preventing the return of the brake pedal 16 to "pedal off" position when the controller pedal 49 is in coasting or any power on position, but it will be understood that I contemplate the use of means which are operated entirely mechanically, an example of such a mechanism being shown in Figs. 9 and 10.

The mechanism illustrated in Figs. 9 and 10 may comprise a bar 190 having one of its ends slidably mounted in the casing of the brake valve device 1 and the other of its ends slidably mounted in a bracket 191 in which the controller shaft 48 is rotatably mounted. The controller shaft is adapted to be rotated through the medium of the foot pedal 49, and at one end has secured thereto a cam 192 having a cam surface 193, which surface is adapted to engage with the car 190 and control its longitudinal sliding movement. When the brake pedal 16 is in release position, and the controller pedal 49 is moved forward toward power on position, the cam surface 193, of the cam 192, slidably engages the outer end of the bar, causing the bar to be shifted toward the right hand against the pressure of a spring 194 interposed between the inner end of the bar and the casing. When the bar is thus shifted, a stop 195, carried thereby, moves into the path of travel of the leg 42 of the pedal 16, forming a stop which prevents the pedal 16 from moving to "foot off" position if the operator should relieve the pressure thereon. When the operator permits the controller pedal to return to power off position, the pressure of the spring 194 returns the bar 190 to the position shown in Fig. 9, in which, the stop 195 is clear of the leg 42 of the brake pedal 16.

From the foregoing description, it will be understood that changes may be made in the details and arrangement of the several parts forming this invention without departing from the spirit and scope of the appended claims.

Having now described my invention, what I claim as new and desire to secure by Letters Patent, is:

1. In a safety car control equipment, the combination with a fluid pressure brake apparatus, of a brake valve device for controlling the operation of said apparatus, and a foot pedal for controlling the operation of said brake valve device, said brake valve device being operative to one position by pressure on said pedal for effecting an emergency application of the brakes, and operative to another position upon the relief of pressure on said pedal for also effecting an emergency application of the brakes.

2. A brake valve device for controlling fluid pressure brakes and comprising a casing having a pressure chamber formed therein, a valve operative to supply fluid under pressure to said chamber, a fluid pressure discharge valve, a rotary valve, said discharge valve and rotary valve being adapted to establish communication through which fluid under pressure is released from said chamber, means subject on one side to the pressure of fluid in said chamber and subject on the other side to the pressure of a spring for controlling the operation of the supply and discharge valves, means operative to vary the pressure of the spring on the first mentioned means, and means operative to control the operation of said rotary valve and pressure varying means.

3. In a fluid pressure brake, the combination with a brake valve device having a pressure chamber, variations in the pressure of which chamber controls the application and release of the brakes, of a manually controlled valve device for controlling the admission and release of fluid under pressure to and from said chamber, a foot pedal for controlling the operation of said valve device, and valve means controlled by said pedal for controlling communication through which said valve device releases fluid under pressure from said chamber.

4. In a fluid pressure brake, the combination with a brake valve device having a pressure chamber, variations in the pressure of which chamber controls the application and release of the brakes, of a manually controlled valve device for controlling the admission and release of fluid under pressure to and from said chamber, a foot pedal for controlling the operation of said valve device, and a rotary valve controlled by said foot pedal for controlling communication through which said valve device releases fluid under pressure from said chamber.

5. In a fluid pressure brake, the combination with a pressure chamber, variations in the pressure of which controls the application and release of the brakes, of a manually controlled valve device for controlling the admission and release of fluid under pressure to and from said chamber, a separate valve means for controlling communication through which said valve device releases fluid under pressure from said chamber, and a foot pedal for operating said valve device and said valve means.

6. In a fluid pressure brake, the combination with a brake valve device having a pressure chamber, an increase in the pressure in which chamber controls the application of the brakes and a decrease in the pressure in which chamber controls the release of the brakes, a valve mechanism subject to manual pressure for supplying fluid under pressure to said chamber, and operative upon the relief of manual pressure for discharging fluid under pressure from said chamber, and valve means establishing communication through which fluid discharged from said chamber flows to the atmosphere, and a foot pedal for controlling the operation of said valve mechanism and valve means.

7. In a fluid pressure brake, the combination with a pressure chamber, an increase in the pressure in which controls the application of the brakes and a decrease in the pressure in which controls the release of the brakes, means subject to manual pressure and the opposing pressure of fluid in said chamber for varying the supply and release of fluid under pressure to and from said chamber to graduate the application and release of the brakes, and separate valve means for controlling communication through which fluid under pressure released from said chamber is discharged to the atmosphere.

8. In a fluid pressure brake, the combination with a pressure chamber, an increase in the pressure in which controls the application of the brakes and a decrease in the pressure in which controls the release of the brakes, means subject to manual pressure and the opposing pressure of fluid in said chamber for varying the supply and release of fluid under pressure to and from said chamber to graduate the application and release of the brakes, separate valve means for controlling communication through which fluid under pressure released from said chamber is discharged to the atmosphere, and a foot pedal for controlling the operation of said valve device and valve means.

9. In a fluid pressure brake, the combination with a pressure chamber, an increase in the pressure in which controls the application of the brakes and a decrease in the pressure in which controls the release of the brakes, a valve operative to supply fluid under pressure to said chamber, a valve operative to release fluid under pressure from said chamber, a rotary valve establishing communication through which the release valve releases fluid under pressure from said chamber, and pressure sensitive means subject to manual pressure for controlling the operation of the supply and release valves.

10. In a fluid pressure brake, the combination with a pressure chamber, an increase in the pressure in which controls the application of the brakes and a decrease in the pressure in which controls the release of the brakes, a valve operative to supply fluid under pressure to said chamber, a valve operative to release fluid under pressure from said chamber, a rotary valve establishing communication through which the release valve releases fluid under pressure from said chamber, and pressure sensitive means subject to the pressure of fluid in said chamber and to opposing manual pressure for operating the supply and release valves to vary the pressure of fluid in said chamber.

11. In a safety car control equipment, the combination with a straight air pipe normally at atmospheric pressure, of means operative manually to one position to vent fluid under pressure to the atmosphere to effect an emergency application of the brakes and operative automatically to another position to vent fluid under pressure to the straight air pipe to effect an emergency application of the brakes.

12. In a safety car control equipment, the combination with a straight air pipe normally at atmospheric pressure, of an emergency pipe normally charged with fluid under pressure and means operative manually to one position to vent fluid under pressure from said emergency pipe to the atmosphere to effect an emergency application of the brakes and operative automatically to another position to vent fluid under pressure from said emergency pipe to said straight air pipe to effect an emergency application of the brakes.

13. In a safety car control equipment, the combination with a straight air pipe and an emergency pipe, of means maintained in release position by manual pressure for supplying fluid under pressure to said emergency pipe and for venting said straight air pipe to the atmosphere, and operative upon the relief of manual pressure to vent fluid under pressure from said emergency pipe to said straight air pipe to effect an emergency application of the brakes.

14. In a safety car control equipment, the combination with a straight air pipe and an emergency pipe, of means maintained in release position by manual pressure for supplying fluid under pressure to said emergency pipe and for venting said straight air pipe to the atmosphere, and operative upon an increase in manual pressure for venting fluid under pressure from said emergency pipe to the atmosphere to effect an emergency application of the brakes, and operative upon the entire relief of manual pressure for venting fluid under pressure from said emergency pipe to said straight air pipe to effect an emergency application of the brakes.

15. In a safety car control equipment, the combination with a straight air pipe and an emergency pipe, of means maintained in release position by manual pressure for supplying fluid under pressure to said emergency pipe and for venting said straight air pipe to the atmosphere, and operative upon an increase in manual pressure to vent fluid under pressure from said emergency pipe to the atmosphere and to supply fluid under pressure to said straight air pipe to effect an emergency application of the brakes, and operative upon the relief of manual pressure to vent fluid under pressure from the emergency pipe to the straight air pipe to effect an emergency application of the brakes.

16. In a fluid pressure brake and door controlling equipment for a vehicle, the combination with a brake valve device and a door controlling valve device for controlling the operation of said equipment, said brake valve device being normally maintained in release position by manual pressure and said door controlling valve device being normally in door closed position, of a door engine having a door opening piston chamber normally vented to the atmosphere through said door controlling valve device and said brake valve device and having a door closing piston chamber normally supplied with fluid under pressure through said door controlling valve device, said brake valve device being operative upon the relief of manual pressure to effect an emergency application of the brakes and to supply fluid under pressure to the door opening piston chamber of said door engine to balance the vehicle door.

17. In a fluid pressure brake and door controlling equipment for a vehicle, the combination with a brake valve device and a door controlling valve device for controlling the operation of said equipment, said brake valve device being normally maintained in release position by manual pressure and said door controlling valve device being normally in door closed position, of a door engine having a door opening piston chamber normally vented to the atmosphere through said door controlling valve device and said brake valve device and having a door closing piston chamber normally supplied with fluid under pressure through said door controlling valve device, said brake valve device being operative upon an increase in manual pressure to emergency position to effect an emergency application of the brakes and to supply fluid under pressure to the door opening piston chamber of said door engine to balance the vehicle door, and operative upon the entire relief of manual pressure to effect an emergency application of the brakes and to supply fluid under pressure to the door opening side of said door engine to balance said door.

18. In a safety car control equipment, the combination with a fluid pressure brake apparatus, of a brake valve device for controlling the operation of said apparatus, a foot pedal for controlling the operation of said brake valve device, said brake valve device being operative to one position by manual pressure on said pedal for effecting an emergency application of the brakes, and operative to another position upon the entire relief of manual pressure on said pedal for also effecting an emergency application of the brakes, a door engine, and a door controlling valve device normally supplying fluid under pressure to the door closing side of the door engine to maintain the car door closed, and establishing communication through which fluid under pressure is supplied to the door opening side of the door engine when said brake valve device is in either position to effect an emergency application of the brakes to balance the car door.

19. In a safety car control equipment, the combination with an emergency valve device for effecting an emergency application of the brakes, of an emergency pipe, a straight air pipe, a brake valve device operative to one position to vent fluid under pressure from said emergency pipe to the atmosphere to effect the operation of said emergency valve device and operative to another position to vent fluid under pressure from said emergency pipe to said straight air pipe to effect the operation of said emergency valve device, a door engine normally maintaining the car door closed, and means included in said brake valve device for supplying fluid under pressure to said door engine to balance the car door when said brake valve device is in either emergency position.

20. In a fluid pressure brake for a vehicle, the combination with a brake cylinder, of a valve device operative to supply and release fluid under pressure to and from the brake cylinder, a foot controlled brake valve device for normally controlling the operation of said valve device, fluid pressure controlled means for opening and closing a door of the vehicle, and means, operative upon the operation of the first mentioned means to open the door, for effecting the operation of said valve device to supply fluid under pressure to the brake cylinder and for rendering said brake valve device inoperative to control the operation of said valve device to release the brakes while said door is open.

21. In a fluid pressure brake for a vehicle, the combination with a brake cylinder, of a valve device operative to supply and release fluid under pressure to and from the brake cylinder, a foot controlled brake valve device for normally controlling the operation of said valve device, fluid pressure controlled means for opening and closing a door of the vehicle, and means operative upon the operation of the first mentioned means to open said door, for rendering said brake valve device non-effective to control the operation of said valve device.

22. In a fluid pressure brake for a vehicle, the combination with a brake cylinder, of a valve device operative to supply and release fluid under pressure to and from the brake cylinder, a foot controlled brake valve device for normally controlling the operation of said valve device, fluid pressure controlled means for opening and closing a door of the vehicle, and means, operative upon the operation of the first mentioned means to open the door, for effecting the operation of said valve device to supply fluid under pressure to the brake cylinder and for rendering said brake valve device inoperative to control the operation of said valve device to release the brakes while said door is open, and operative upon the operation of the first mentioned means to close said door for again rendering said brake valve device effective to control the operation of said valve device.

23. In a fluid pressure brake, the combination with a valve device for controlling the application and release of the brakes, said valve device being maintained in release position by manual pressure and operative to an emergency position upon the relief of manual pressure, of means for operating a car motor controller, and means operative upon the operation of the first mentioned means toward power on position to prevent the operation of said valve device to said emergency position when the manual pressure on said valve device is relieved.

24. In a fluid pressure brake, the combination with a valve device for controlling the application and release of the brakes, said valve device being maintained in release position by manual pressure and operative to an emergency position upon the relief of manual pressure, of means for operating a car motor controller, and means operative by fluid under pressure upon the operation of the first mentioned means toward power on position to prevent the operation of said valve device to said emergency position when the manual pressure on said valve device is relieved.

25. In a fluid pressure brake, the combination with a valve device for controlling the application and release of the brakes, said valve device being maintained in release position by manual pressure and operative to an emergency position upon the relief of manual pressure, of a foot pedal for operating a car motor controller, and means operative upon the operation of said foot pedal toward power on position to lock said valve device against movement to said emergency position when the manual pressure on said valve device is relieved.

26. In a fluid pressure brake, the combination with a valve device for controlling the application and release of the brakes, said valve device being maintained in release position by manual pressure and operative automatically upon the relief of manual pressure to effect an emergency application of the brakes, means for operating a car motor controller, and means operative upon the operation of the first mentioned means toward power on position for maintaining said valve device in release position upon the relief of manual pressure on said valve device.

27. In a fluid pressure brake, the combination with a valve device operative to control the application and release of the brakes, said valve device being operative to release position by manual pressure and operative to another position upon the relief of manual pressure to effect an emergency application of the brakes, means for operating a motor controller to power on and power off positions, and means operative upon the operation of the first mentioned means to power on position for preventing the operation of said valve device to effect an emergency application of the brakes upon the relief of the manual pressure on said valve device, and operative upon the operation of the first mentioned means to power off position for permitting said valve device to operate to effect an emergency application of the brakes unless the operation of said valve device is prevented by manual pressure.

28. In a fluid pressure brake, the combination with a valve device operative to control the application and release of the brakes, said valve device being operative to release position by manual pressure and operative to another position upon the relief of manual pressure to effect an emergency application of the brakes, a foot pedal for controlling the operation of said valve device, a member for controlling the operation of a car motor controller, a stop movable into the path of travel of said pedal, upon the operation of said member toward power on position, to prevent the operation of said valve device to effect an emergency application of the brakes upon the relief of the manual pressure on said pedal, and movable out of the path of travel of said pedal upon the operation of said member to power off position to permit said valve device to operate to effect an emergency application of the brakes when said pedal is relieved of manual pressure.

29. In a safety car control equipment, the combination with a main reservoir charged with fluid under pressure, of a circuit breaker device operative by fluid under pressure for opening the car motor circuit, a valve device automatically operative upon the incapacitation of an operator to effect an emergency application of the brakes, and valve means operative upon the automatic operation of said valve device to supply fluid under pressure from said main reservoir to said circuit breaker device.

30. In a safety car control equipment, the combination with a main reservoir charged with fluid under pressure, of a sanding reservoir, and means operative, upon the incapacitation of an operator, to charge said sanding reservoir with fluid under pressure from said main reservoir.

31. In a safety car control equipment, the combination with a main reservoir charged with fluid under pressure, of a sanding reservoir charged with fluid under pressure from the main reservoir upon the incapacitation of an operator, a sanding pipe leading from said sanding reservoir, and means for restricting the flow of fluid from said sanding reservoir through said sanding pipe.

32. In a safety car control equipment, the combination with a main reservoir charged with fluid under pressure, of a sanding reservoir charged with fluid under pressure from the main reservoir upon the incapacitation of an operator, a sanding pipe leading from said sanding reservoir, means for restricting the flow of fluid from said sanding reservoir through said pipe, and means for preventing back flow of fluid from said sanding reservoir.

33. In a safety car control equipment, the combination with a main reservoir charged with fluid under pressure, of a circuit breaker device operative by fluid under pressure for opening the car motor circuit, a sanding reservoir, and means operative, upon the incapacitation of an operator, to supply fluid under pressure from the main reservoir to said sanding reservoir and circuit breaker device.

34. In a safety car control equipment, the combination with a main reservoir charged with fluid under pressure, of a circuit breaker device operative by fluid under pressure for opening the car motor circuit, a sanding reservoir, and means operative, upon the incapacitation of an operator, to supply fluid under pressure from the main reservoir to said sanding reservoir and circuit breaker device, said means comprising a piston valve operative to close off the supply of fluid under pressure to said sanding reservoir and circuit breaker device upon the equalization of the pressure of fluid on both sides of said piston valve means for venting fluid under pressure from said circuit breaker device to permit said device to return to its normal position when said piston valve closes off the flow of fluid from the main reservoir, and means for preventing the back flow of fluid from said sanding reservoir.

35. In a safety car control equipment, the combination with a main reservoir charged with fluid under pressure, of a circuit breaker device adapted to be operated by fluid under pressure from the main reservoir for opening the car motor circuit, a sanding reservoir adapted to be charged with fluid under pressure from the main reservoir, pressure sensitive means normally closing communication from said main reservoir to said sanding reservoir and circuit breaker device, said pressure sensitive means being subject on both sides to main reservoir pressure, and a valve device operative upon the incapacitation of an operator for reducing the pressure on one side of said pressure sensitive means to effect the operation of said pressure sensitive means to supply fluid under pressure to said sanding reservoir and said circuit breaker device.

36. In a safety car control equipment, the combination with a main reservoir charged with fluid under pressure, of a circuit breaker device adapted to be operated by fluid under pressure from the main reservoir for opening the car motor circuit, a sanding reservoir adapted to be charged with fluid under pressure from the main reservoir, a straight air pipe, pressure sensitive means subject on both sides to main reservoir pressure and normally closing communication from said main reservoir to said sanding reservoir and circuit breaker device, a valve device operative to effect an emergency application of the brakes and for venting fluid under pressure from one side of said pressure sensitive means to said straight air pipe for effecting the operation of the pressure sensitive means to supply fluid under pressure to said sanding reservoir and circuit breaker device.

37. In a safety car control equipment, the combination with a manually operative valve device for controlling the application and release of the brakes, a sanding pipe, a door engine for controlling the operation of a car door and a valve device operative to positions for controlling the operation of said door engine and to a position for supplying fluid under pressure to said sanding pipe.

38. In a safety car control equipment, the combination with a manually operative valve device for controlling the application and release of the brakes, a sanding pipe, a door engine for controlling the operation of a car door and a valve device operative to control the operation of said door engine and to supply fluid under pressure to said sanding pipe.

39. In a safety car control equipment, the combination with a manually operative valve device for controlling the application and release of the brakes, a main reservoir charged with fluid under pressure, a sanding pipe, and a valve device for controlling the car doors and for supplying fluid under pressure from said main reservoir to said sanding pipe.

40. In a safety car control equipment, the combination with a manually operative valve device for controlling the application and release of the brakes, a main reservoir charged with fluid under pressure, a sanding pipe, and a door control valve device operative to supply fluid under pressure to said sanding pipe.

41. A foot valve device for controlling the operation of a fluid pressure brake and comprising a valve for supplying fluid under pressure for effecting an application of the brakes, a valve for discharging fluid under pressure to effect the release of the brakes, a rotary valve operative to establish communications through which fluid supplied and released by said valves flows, a shaft for operating said rotary valve, means for controlling the operation of the supply and discharge valves, and a foot pedal for controlling the operation of said shaft and means.

42. A foot valve device for controlling the operation of a fluid pressure brake and comprising a valve for supplying fluid under pressure for effecting an application of the brakes, a valve for discharging fluid under pressure to effect the release of the brakes, a rotary valve operative to establish communications through which fluid supplied and released by said valves flows, a shaft for operating said rotary valve, means for controlling the operation of the supply and discharge valves, and a foot pedal for controlling the operation of said shaft and means, said shaft being rotatable a predetermined distance relative to said rotary valve.

43. A foot valve device for controlling the operation of a fluid pressure brake and comprising a valve for supplying fluid under pressure for effecting an application of the brakes, a valve for discharging fluid under pressure to effect the release of the brakes, a rotary valve operative to establish communications through which fluid supplied and released by said valves flows, a shaft for operating said rotary valve, means for controlling the operation of the supply and discharge valves, said means comprising a spring, the pressure of which is adapted to be varied, and a foot pedal for controlling the operation of said shaft and means, said shaft being movable a limited distance relative to said rotary valve for adjusting the pressure on said spring without operating said rotary valve.

44. In a safety car control equipment, the combination with means for effecting an application and the release of the brakes, of a manually operable member for operating said means, said means being operative in two positions of said member to effect an emergency application of the brakes and in an intermediate position to effect the release of the brakes.

45. In a safety car control equipment, the combination with means for effecting an application and the release of the brakes, of a manually operable member for operating said means, said means being operated in two positions of said member to effect an emergency application of the brakes, in an intermediate position to effect the release of the brakes, and in positions between one of the first mentioned positions and said intermediate position to graduate the application and release of the brakes.

46. In a safety car control equipment, the combination with means for effecting an application and the release of the brakes, of a manually operable member for operating said means, said means being operated in two positions of said member to effect an emergency application of the brakes, in an intermediate position to effect the release of the brakes, and in a position between one of the first mentioned positions and said intermedate position to effect a service application of the brakes.

47. A valve device having positions for controlling the operation of a door of a car and having a position for controlling the sanding of the track rails upon which the car runs, and means for indicating when said valve device is in sanding position.

48. A valve device having positions for controlling the operation of a door of a car and having a position for controlling the sanding of the track rails upon which the car runs, and means for audibly indicating when said valve device is in sanding position.

49. A valve device having positions for controlling the operation of a door of a car and having a position for controlling the sanding of the track rails upon which the car runs, and means included in the valve device for audibly indicating when said device is in sanding position.

50. A valve device having positions for controlling the operation of a door of a car and having a position for controlling the sanding of the track rails upon which the car runs, and means included in the valve device for producing sound while the valve device is in sanding position.

51. In a safety car control equipment, the combination with a manually operative valve device for controlling the application and release of the brakes, a sanding pipe, a door engine for controlling the operation of a car door a valve device operative to control the operation of said door engine and also operative to supply fluid under pressure to said sanding pipe, and means for audibly indicating that fluid under pressure is being supplied to said sanding pipe.

52. The combination with fluid pressure brake apparatus, of means subject to variations in the pressure of a foot of an operator for normally controlling the operation of said apparatus to effect an application and release of the brakes, said means being operative upon the entire relief of the operator's foot pressure for effecting a dead man's emergency application of the brakes.

53. In a safety car control equipment, the combination with means subject to variations in the foot pressure of an operator for normally controlling the operation of said equipment to effect the application and release of the brakes, said means being operative upon the relief of the operator's foot pressure for effecting an emergency application of the brakes, the sanding of the track rails upon which the car runs, and the opening of the electric motor control circuit of the car.

54. In a safety car control equipment, the combination with means subject to variations in the foot pressure of an operator for normally controlling the operation of said equipment to effect the application and release of the brakes, said means being operative upon the relief of the operator's foot pressure for effecting an emergency application of the brakes, the sanding of the track rails upon which the car runs, the balancing of the doors of the car, and the opening of an electric motor control circuit of the car.

55. In a fluid pressure brake for a vehicle, the combination with an emergency valve device operative to effect an application and release of the brakes, of an emergency pipe through which fluid under pressure is supplied and released to and from said emergency valve device, a brake valve device at each end of the vehicle for controlling the supply and release of fluid through said emergency pipe, and means operated by the flow of fluid through said pipe from the brake valve device at one end of the vehicle for cutting off communication from said emergency valve device to the brake valve device at the other end of the vehicle.

56. In a fluid pressure brake for a vehicle, the combination with an emergency valve device operative to effect an application and release of the brakes, of an emergency pipe through which fluid under pressure is supplied and released to and from said emergency valve device, a brake valve device at each end of the vehicle for controlling the supply and release of fluid through said emergency pipe, and a double check valve device operated by the flow of fluid through said pipe from the brake valve device at one end of the vehicle for cutting off communication from said emergency valve device to the brake valve device at the other end of the vehicle.

57. In a double end fluid pressure brake equipment for a vehicle the combination with an emergency valve device, an emergency pipe and a brake valve device at each end of the vehicle, of valve means operative by fluid under pressure supplied to the emergency pipe through one of said brake valve devices for closing communication from said emergency valve device through the other of said brake valve devices.

58. In a double end fluid pressure brake equipment for a vehicle, the combination with an emergency valve device, an emergency pipe and a brake valve device at each end of the vehicle, of valve means interposed in said emergency pipe between said emergency valve device and the brake valve devices and operative by fluid under pressure supplied to said pipe through one of said brake valve devices to close off communication from said emergency valve device to the other of said valve devices.

59. In a double end fluid pressure brake equipment for a vehicle, the combination with an emergency valve device, an emergency pipe and a brake valve device at each end of the vehicle, of a valve device interposed in said emergency pipe between said emergency valve device and the brake valve devices and normally establishing communication from one of the brake valve devices to said emergency valve device, and operative upon the operation of the other of the brake valve devices for closing off the first mentioned communication and establishing communication from the last mentioned brake valve device to the emergency valve device.

60. In a double end fluid pressure brake equipment for a vehicle, the combination with a straight air pipe, means operated upon the supplying of fluid under pressure to said pipe for effecting an application of the brakes and operated upon the venting of fluid under pressure from said pipe for effecting a release of the brakes, an emergency pipe, valve means operative upon the release of fluid under pressure from said emergency pipe for effecting an emergency application of the brakes, a brake valve device at the non-operating end of the vehicle establishing communication from the emergency pipe to the straight air pipe, a brake valve device at the operating end of the vehicle having a position for venting fluid under pressure from said straight air pipe to release the brakes and for establishing communication through which fluid under pressure is supplied to said valve means, and means operative upon the venting of the straight air pipe and the supplying of fluid under pressure to said valve means for closing off communication from said valve means to said straight air pipe.

61. The combination with a brake cylinder, of means operative to supply and release fluid under pressure to and from the brake cylinder, means for establishing communication through which fluid under pressure is supplied and released to and from the first mentioned means, and means for controlling the opening and closing of a vehicle door, the second mentioned means being operative to close said communication when the means for controlling the vehicle door is operated to open the door.

62. In a fluid pressure brake and door controlling equipment for a vehicle, the combination with a brake cylinder, of means normally venting the brake cylinder and operative by fluid under pressure to supply fluid under pressure to the brake cylinder to effect an application of the brakes, and means normally establishing communication through which the first mentioned means is vented to maintain the first mentioned means in position to vent the brake cylinder and operative upon the opening of a door of the vehicle for closing said communication and for establishing another communication through which fluid under pressure is supplied to first mentioned means to effect an application of the brakes.

63. In a fluid pressure brake and door controlling equipment for a vehicle, the combination with a brake cylinder, of means operative by fluid under pressure for supplying fluid under pressure to the brake cylinder to effect an application of the brakes and operative upon the venting of fluid under pressure therefrom for effecting the release of the brakes, and a valve device normally establishing communication through which fluid under pressure is supplied and released to and from said means and operative, when a door of the vehicle is being opened, for closing off said communication and establishing another communication through which fluid under pressure is supplied to said means.

64. In a fluid pressure brake and door controlling equipment for a vehicle, the combination with a brake cylinder, of means operative by fluid under pressure for supplying fluid under pressure to the brake cylinder to effect an application of the brakes and operative upon the venting of fluid under pressure therefrom for effecting the release of the brakes, a valve device normally establishing communication through which fluid under pressure is supplied and released to and from said means and operative, when a door of the vehicle is being opened, for closing off said communication and establishing another communication through which fluid under pressure is supplied to said means, and means for retarding the operation of said valve means to supply fluid under pressure to the first mentioned means through the last mentioned communication.

65. In a fluid pressure brake and door controlling equipment for a vehicle, the combination with a brake cylinder, of means operative by fluid under pressure for supplying fluid under pressure to the brake cylinder to effect an application of the brakes and operative upon the venting of fluid under pressure therefrom for effecting the release of the brakes, a valve device normally establishing communication through which fluid under pressure is supplied and released to and from said means and operative, when a door of the vehicle is being opened, for closing off said communication and establishing another communication through which fluid under pressure is supplied to said means, and means for delaying the operation of said valve device to establish the last mentioned communication for a predetermined time after the opening of the door has been initiated.

66. In a fluid pressure brake for a vehicle, the combination with a straight air pipe, means operated upon the supplying of fluid under pressure to said pipe for effecting an application of the brakes and operated upon the venting of fluid under pressure from said pipe for effecting a release of the brakes, a brake valve device normally controlling the supply and release of fluid to and from said pipe, means operative to control the opening and closing of a door of the vehicle, and means, operative upon the operation of the door controlling means to open said door, for rendering said brake valve device ineffective to control the brakes.

67. In a fluid pressure brake for a vehicle, the combination with a straight air pipe, means operated upon the supplying of fluid under pressure to said pipe for effecting an application of the brakes and operated upon the venting of fluid under pressure from said pipe for effecting a release of the brakes, a brake valve device normally controlling the supply and release of fluid to and from said pipe, means operative to control the opening and closing of a door of the vehicle, and means, operative upon the operation of the door controlling means to open said door, for closing off communication through which fluid under pressure is supplied and released from said straight air pipe by said brake valve device and for establishing another communication through which fluid under pressure is supplied to said straight air pipe.

68. In a fluid pressure brake for a vehicle, the combination with a straight air pipe, means operated upon the supplying of fluid under pressure to said pipe for effecting an application of the brakes and operated upon the venting of fluid under pressure from said pipe for effecting a release of the brakes, a brake valve device normally controlling the supply and release of fluid to and from said pipe, means operative to control the opening and closing of a door of the vehicle, valve means operative to close off communication through which said brake valve supplies and releases fluid under pressure to and from said pipe and to establish another communication through which fluid under pressure is supplied to said pipe, and means for retarding the operation of said valve means for a predetermined period of time after the opening of the door has been initiated.

69. In a safety car control equipment the combination with a straight air pipe, of valve means normally subject to fluid under pressure, a device operated upon a reduction in fluid pressure on said valve means for opening the power circuit of the car, and manually controlled means movable to one position in which said valve means is connected to the straight air pipe and to another position in which said valve means is connected to a maintained source of fluid pressure.

70. In a safety car control equipment, the combination with a straight air pipe and a main reservoir, of valve means normally subject to fluid under pressure from said main reservoir, a device operated upon a reduction in fluid pressure on said valve means for opening the power circuit of the car, of manually controlled means movable to one position in which said valve means is connected to the straight air pipe and to another position in which said valve means is connected to said main reservoir.

71. In a safety car control equipment, the combination with a straight air pipe and an emergency pipe, of a valve device normally subject to fluid under pressure and operated upon a reduction in fluid pressure for controlling the opening of the power circuit of the car, and manually controlled means movable to one position in which said valve means and emergency pipe are connected to said straight air pipe and to another position in which said valve means is connected to a maintained source of fluid pressure and said straight air pipe is connected to said emergency pipe.

72. In a safety car control equipment, the combination with a main reservoir, a straight air pipe and an emergency pipe, of a valve device normally subject to fluid under pressure from said main reservoir and operated upon a reduction in fluid pressure for controlling the opening of the power circuit of the car, and manually controlled means movable to one position in which said valve means and emergency pipe are connected to said straight air pipe and to another position in which said straight air pipe is connected to the emergency pipe and said valve means is connected to said main reservoir.

73. In a safety car control equipment, the combination with valve means normally subject to fluid under pressure and operative upon a reduction in fluid pressure for controlling the opening of the power circuit of the car, of an emergency pipe and a straight air pipe, and manually controlled means movable to an emergency position in which said emergency pipe is vented to the atmosphere and in which a reduction in fluid pressure on said valve means is prevented and movable to another emergency position in which fluid under pressure in said valve means and emergency pipe are vented to said straight air pipe.

74. In a safety car control equipment, the combination with valve means normally subject to fluid under pressure and operative upon a reduction in fluid pressure for controlling the opening of the power circuit of the car, of an emergency pipe and a straight air pipe, and manually controlled means movable to an emergency position in which said emergency pipe is vented to the atmosphere and in which a reduction in fluid pressure on said valve means is prevented and movable to another emergency position in which fluid under pressure in said valve means and emergency pipe are vented to said straight air pipe, and movable to a position for changing ends in which the straight air pipe is connected to the emergency pipe and said valve means is connected to a maintained source of fluid pressure.

75. In a safety car control equipment, the combination with valve means normally subject to fluid under pressure and operative upon a reduction in fluid pressure for controlling the opening of the power circuit of the car, of an emergency pipe and a straight air pipe, and means movable by manual pressure to an emergency position in which said emergency pipe is vented to the atmosphere and in which a reduction in fluid pressure on said valve means is prevented and movable to another emergency position upon the relief of manual pressure in which fluid under pressure is vented from said valve means and emergency pipe to the straight air pipe.

76. In a safety car control equipment the combination with valve means normally subject to fluid under pressure, of a straight air pipe and an emergency pipe, of manually controlled means movable to release position in which said straight air pipe is connected to the atmosphere and the pressure of fluid on said valve means and emergency pipe are maintained and movable to service position in which fluid under pressure is supplied to said straight air pipe and the pressures of fluid on said valve means and emergency pipe are maintained and movable to an emergency position in which said emergency pipe and valve means is connected to said straight air pipe.

77. In a safety car control equipment the combination with valve means normally subject to fluid under pressure, of a straight air pipe and an emergency pipe, of manually controlled means movable to release position in which said straight air pipe is connected to the atmosphere and the pressure of fluid on said valve means and emergency pipe are maintained and movable to service position in which fluid under pressure is supplied to said straight air pipe and the pressures of fluid on said valve means and emergency pipe are maintained and movable to two emergency positions, in one of which emergency positions the emergency pipe is vented to the atmosphere and the pressure of fluid on said valve means maintained and in the other of which emergency positions the emergency pipe and valve means is connected to the straight air pipe.

78. In a safety car control equipment, the combination with valve means normally subject to fluid under pressure and operated upon the reduction in fluid under pressure for controlling the opening of the power circuit of the car, of a brake valve device for controlling the application and release of the brakes and having a removable member controlled manually for operating said brake valve device to a plurality of positions for normally controlling the application and release of the brakes, said brake valve device being operative upon the relief of manual pressure on said member for normally reducing the pressure of fluid on said valve means and operative, upon the removal of said member, to a position in which the valve means is connected to a maintained source of fluid pressure.

79. In a safety car control equipment, the combination with a straight air pipe and an emergency pipe, of valve means normally subject to fluid under pressure and operated upon a reduction in fluid under pressure for controlling the opening of the power circuit of the car, a brake valve device movable to a plurality of positions to normally control the application and release of the brakes and having a removable member controlled by manual pressure for normally controlling the brakes, said brake valve device being operative upon the relief of manual pressure on said member for connecting said valve means and emergency pipe to said straight air pipe and operative to a position in which said valve means is connected to a maintained source of fluid pressure and the straight air pipe is connected to the emergency pipe upon the removal of said member from the brake valve device.

80. In a safety car control equipment, the combination with a brake cylinder, of valve means normally subject to fluid under pressure, a device operated upon a reduction in fluid pressure on said valve means for opening the power circuit of the car, and manually controlled means movable to one position in which said valve means is subject to the pressure of fluid corresponding to brake cylinder pressure and to another position in which said valve means is subject to a maintained source of fluid pressure.

81. In a fluid pressure brake, the combination with valve means for controlling the brakes, of a removable foot pedal for operating said valve means having a foot off position and a pedal off position, means tending to move said valve means to the pedal off position, and means for preventing movement of said valve means to pedal off position upon removal of the foot from said pedal.

82. In a fluid pressure brake, the combination with valve means for controlling the brakes, of a removable foot pedal for operating said valve means having a foot off position and a pedal off position, spring means tending to move said valve means to the pedal off position, and means for preventing movement of said valve means to pedal off position upon removal of the foot from said pedal.

83. In a fluid pressure brake, the combination with valve means operative to control the brakes, of a removable pedal for controlling the operation of said valve means, said valve means having a foot off position and a pedal off position, and means for normally preventing the operation of said valve device from foot off position to pedal off position and for permitting the operation of said valve means to pedal off position upon the removal of said pedal.

84. In a fluid pressure brake, the combination with valve means operative to control the brakes, of a removable pedal for controlling the operation of said valve means, said valve means having a foot off position and a pedal off position, and means for normally preventing the operation of said valve device from foot off position to pedal off position, and means for operating said valve means to pedal off position upon the removal of said pedal.

85. In a fluid pressure brake, the combination with valve means operative to control the brakes, of a removable pedal for controlling the operation of said valve means, said valve means having a foot off position and a pedal off position, and means for normally preventing the operation of said valve device from foot off position to pedal off position, and means for automatically operating said valve means to pedal off position upon the removal of said pedal.

86. In a fluid pressure brake, the combination with valve means operative to control the brakes, of a removable pedal for controlling the operation of said valve means, said valve means having a foot off position and a pedal off position, and means for normally preventing the operation of said valve device from foot off position to pedal off position, and spring means for operating said valve means to pedal off position upon the removal of said pedal.

87. In a fluid pressure brake, the combination with valve means operative to control the brakes, of a removable pedal for controlling the operation of said valve means, said valve means having a foot off position and a pedal off position, and means tending to operate the valve means to pedal off position, a stop with which said pedal is adapted to engage to normally prevent the operation of said valve means to pedal off position, said means being adapted to operate said valve device to pedal off position upon the removal of said pedal.

88. In a fluid pressure brake, the combination with valve means operative to control the brakes, of a removable pedal for controlling the operation of said valve means, said valve means having a foot off position and a pedal off position, and spring means tending to operate the valve means to pedal off position, a stop with which said pedal is adapted to engage to normally prevent the operation of said valve means to pedal off position, said spring means being adapted to operate said valve device to pedal off position upon the removal of said pedal.

89. In a fluid pressure brake, the combination with valve means operative to control the brakes, of a removable pedal for controlling the operation of said valve means, said valve means having a foot off position and a pedal off position, spring means for operating said valve means to foot off position and tending to operate said valve means to pedal off position, and means with which said pedal cooperates to prevent the operation of said valve means to pedal off position.

90. In a fluid pressure brake, the combination with valve means operative to control the brakes, of a removable pedal for controlling the operation of said valve means, said valve means having a foot off position and a pedal off position, and means for normally preventing the operation of said valve device from foot off position to pedal off position, means for operating said valve means to pedal off position upon the removal of said pedal, and means for stopping the operation of said valve means in pedal off position.

91. In a fluid pressure brake, the combination with a brake controlling valve device having a pressure chamber, an increase in the pressure in which chamber controls the application of the brakes and a decrease in the pressure in which chamber controls the release of the brakes, of a manually controlled valve mechanism for controlling the admission of fluid under pressure to said chamber and for controlling a communication through which fluid under pressure is adapted to be released from said chamber, a foot pedal for controlling the operation of said valve mechanism, and valve means controlled through the medium of said foot pedal for also controlling said communication.

JOSEPH C. McCUNE.